United States Patent
Ohashi

(10) Patent No.: US 7,225,221 B2
(45) Date of Patent: May 29, 2007

(54) METHOD AND SYSTEM FOR RETRIEVING INFORMATION, AND COMPUTER PRODUCT

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 553 days.

(21) Appl. No.: 09/805,047

(22) Filed: Mar. 14, 2001

(65) Prior Publication Data

US 2002/0040289 A1 Apr. 4, 2002

(30) Foreign Application Priority Data

Oct. 2, 2000 (JP) .............................. 2000-339730
Nov. 24, 2000 (JP) .............................. 2000-358305

(51) Int. Cl.
*G06F 15/16* (2006.01)
*G06F 7/00* (2006.01)

(52) U.S. Cl. .................. 709/203; 709/217; 707/10
(58) Field of Classification Search ................ 709/206, 709/203, 217–219, 227–231; 707/10; 714/4
See application file for complete search history.

(56) References Cited

U.S. PATENT DOCUMENTS

| 5,423,033 | A | * | 6/1995 | Yuen | 707/4 |
| 5,526,520 | A | * | 6/1996 | Krause | 707/104.1 |
| 5,680,613 | A | * | 10/1997 | Atsumi | 707/103 R |
| 5,732,264 | A | * | 3/1998 | Tanaka | 707/4 |
| 6,094,658 | A | * | 7/2000 | Araki | 707/104.1 |
| 6,208,659 | B1 | * | 3/2001 | Govindarajan et al. | 370/410 |
| 6,289,345 | B1 | * | 9/2001 | Yasue | 707/10 |
| 6,516,337 | B1 | * | 2/2003 | Tripp et al. | 709/202 |
| 6,539,399 | B1 | * | 3/2003 | Hazama et al. | 707/104.1 |
| 6,654,747 | B1 | * | 11/2003 | Van Huben et al. | 707/10 |
| 6,711,585 | B1 | * | 3/2004 | Copperman et al. | 707/104.1 |

FOREIGN PATENT DOCUMENTS

| JP | 09-204442 | 8/1997 |
| JP | 2000-163445 | 6/2000 |
| WO | WO 200115014 A2 * | 3/2001 |

OTHER PUBLICATIONS

Japanese Office Action for corresponding Japanese Patent Application No. 2000-358305 dated Jan. 29, 2007.

* cited by examiner

*Primary Examiner*—Krisna Lim
*Assistant Examiner*—Yasin Barqadle
(74) *Attorney, Agent, or Firm*—Staas & Halsey LLP

(57) ABSTRACT

In an information retrieving system, an index server is provided to retrieve design/manufacturing information registered in a plurality of web servers. A register processing agent delivers an abstract and storage location information of registered information of each web server, to a registration accept processing agent.

25 Claims, 19 Drawing Sheets

FIG.14A

OVIS : Over View Index System

FIRST CATEGORY SEARCH CONDITION SUB-FRAME

- FIRST KEYWORD: SYDNEY
  (AND /OR/ EOR)
- SECOND KEYWORD: Model2000
  (AND /OR/ EOR)
- THIRD KEYWORD: DEVELOPMENT PLAN
  (AND /OR/ EOR)
- FOURTH KEYWORD:
  (AND /OR/ EOR)
- FIFTH KEYWORD:

★ SEARCH START

SEARCH RESULT: IN TOTAL, 2342 CASES OF CORRESPONDING INFORMATION HAVE BEEN FOUND. MAKE DISPLAY OF THE LIST?
● NO
○ YES

FIG.14B

OVIS : Over View Index System

FIRST CATEGORY

| SEARCH RESULT | FIRST CATEGORY |
|---|---|
| CF=100% | SYDNEY-MODEL2000 DEVELOPMENT PLAN |
| CF= 50% | SYDNEY BPH2 STRUCTURE DESIGN SPECIFICATION |
| CF= 38% | SYDNEY LOGIC DESIGN SPECIFICATION |
| CF= 40% | SYDNEY BPH4 DESIGN SPECIFICATION |
| CF= 33% | SYDNEY ASP HANDLING MANUAL |
| CF= 20% | SYDNEY SHIPMENT DECISION MEETING MATERIAL |
| CF= 10% | SYDNEY BPH2 PURCHASE SPECIFICATION |

SECOND CATEGORY SEARCH CONDITION SUB-FRAME

- FIRST KEYWORD: DESIGN REVIEW
  (AND /OR/ EOR)
- SECOND KEYWORD:
  (AND /OR/ EOR)
- THIRD KEYWORD:
  (AND /OR/ EOR)
- FOURTH KEYWORD:
  (AND /OR/ EOR)
- FIFTH KEYWORD:

★ SEARCH START

FIG.15A

OVIS : Over View Index System

SEARCH RESULT

IN TOTAL, 2342 CASES OF CORRESPONDING INFORMATION HAVE BEEN FOUND. MAKE DISPLAY OF THE LIST?
- NO
- YES

MACHINE TYPE NAME: SYDNEY Model2000

DOCUMENT NAME: DEVELOPMENT PLAN

| SEARCH RESULT | SECOND CATEGORY |
|---|---|
| CF=100% | SYDNEY MODEL2000 DESIGN REVIEW |
| CF= 50% | SYDNEY BPH2 STRUCTURE DESIGN SPECIFICATION |
| CF= 38% | SYDNEY LOGIC DESIGN SPECIFICATION |
| CF= 40% | SYDNEY BPH4 DESIGN SPECIFICATION |
| CF= 33% | SYDNEY ASP HANDLING MANUAL |
| CF= 20% | SYDNEY SHIPMENT DECISION MEETING MATERIAL |
| CF= 10% | SYDNEY BPH2 PURCHASE SPECIFICATION |

\* SEARCH START

FIG.15B

OVIS : Over View Index System

MACHINE TYPE NAME: SYDNEY Model2000

DOCUMENT NAME: DESIGN REVIEW

SYDNEY

Model2000

DESIGN REVIEW

HIERARCHICAL STRUCTURE OF DOCUMENTS AND DRAWINGS (F TYPE NAME)

TEST SPECIFICATION

METHOD AND SYSTEM FOR RETRIEVING INFORMATION, AND COMPUTER PRODUCT

FIELD OF THE INVENTION

The present invention in general relates to an information retrieving system that retrieves design/manufacturing information of a great variety of file formats registered in a plurality of web servers, by using an index server disposed at the center. More particularly, this invention relates to a method and system for retrieving information capable of efficiently automatically registering information registered in a plurality of web servers into an index server.

BACKGROUND OF THE INVENTION

Conventionally, an enterprise has had a function that integrally manages a company design information system. When each business department independently registers design/manufacturing information relating to the hardware and firmware of a product into a server, this design/manufacturing information can be provided to users beyond the fence of the business department.

When an information-retrieving user wants to retrieve necessary design information, the user searches this information based on one of the following methods. The user (1) utilizes an URL list table that shows servers and business departments in which the necessary design/manufacturing information are stored. The user (2) searches the information by following the link. The user (3) searches the information in a homepage of a likely business department. The user (4) uses a retrieval tool provided by the homepage of each business department.

However, there are a great variety of servers of design functions and manufacturing functions that are to be searched. Further, there are alterations, deletions and additions of URLs in respective servers for the sake of convenience of the function of managing each server. Therefore, it has not always been possible for the information-retrieving users to catch this information.

Furthermore, there are a variety of data formats and file formats of information that are registered in each server. Therefore, the information-retrieving users have not been able to understand who has registered what information and when such information has been registered, at all. Moreover, in many cases, the information-retrieving users suddenly want to obtain design/manufacturing information. Therefore, it is not efficient to ask the information-retrieving users to understand the location of this information.

SUMMARY OF THE INVENTION

It is an object of this invention to provide an information retrieving system capable of efficiently automatically registering information registered in a plurality of web servers into an index server, thereby to enable information-retrieving users to promptly and efficiently retrieve the information. It is another object of this invention to provide a computer readable recording medium that stores a computer program which when executed realizes the method according to the present invention.

The information retrieving system according to one aspect of this invention comprises a transmitting unit that transmits an abstract and storage location information of design/ manufacturing information registered in the plurality of web servers, to an index server during an idle time of the web servers; and an automatic registering unit that automatically registers an abstract and storage location information transmitted from web servers by the transmitting unit, into the index server.

According to the above-mentioned aspect, an abstract and storage location information of design/manufacturing information registered in the plurality of web servers, are transmitted to an index server during an idle time of the web servers. Further, the abstract and storage location information that have been transmitted are automatically registered into the index server. Therefore, it is possible to efficiently automatically register the information registered in the plurality of web servers into the index server, thereby to enable information-retrieving users to promptly and efficiently retrieve the information.

The information retrieving method according to another aspect of this invention comprises a transmission step of transmitting an abstract and storage location information of design/manufacturing information registered in the plurality of web servers, to an index server during an idle time of the web servers; and an automatic registration step of automatically registering an abstract and storage location information transmitted from web servers by the transmitting unit, into the index server.

According to the above-mentioned aspect, an abstract and storage location information of design/manufacturing information registered in the plurality of web servers, are transmitted to an index server during an idle time of the web servers. Further, the abstract and storage location information that have been transmitted are automatically registered into the index server. Therefore, it is possible to efficiently automatically register the information registered in the plurality of web servers into the index server, thereby to enable information-retrieving users to promptly and efficiently retrieve the information.

Other objects and features of this invention will become apparent from the following description with reference to the accompanying drawings.

BRIEF DESCRIPTION OF THE DRAWINGS

FIG. 14A and FIG. 14B are diagrams showing one example of a display screen when the information retrieving system shown in FIG. 1 retrieves a keyword;

FIG. 15A and FIG. 15B are diagrams showing one example of a display screen when the information retrieving system shown in FIG. 1 retrieves a keyword;

DESCRIPTION OF THE PREFERRED EMBODIMENTS

Preferred embodiments of an information retrieving system relating to the present invention will be explained in detail below with reference to the accompanying drawings. For the sake of convenience of the explanation, a case of using two web servers will be explained below.

Figure 1:
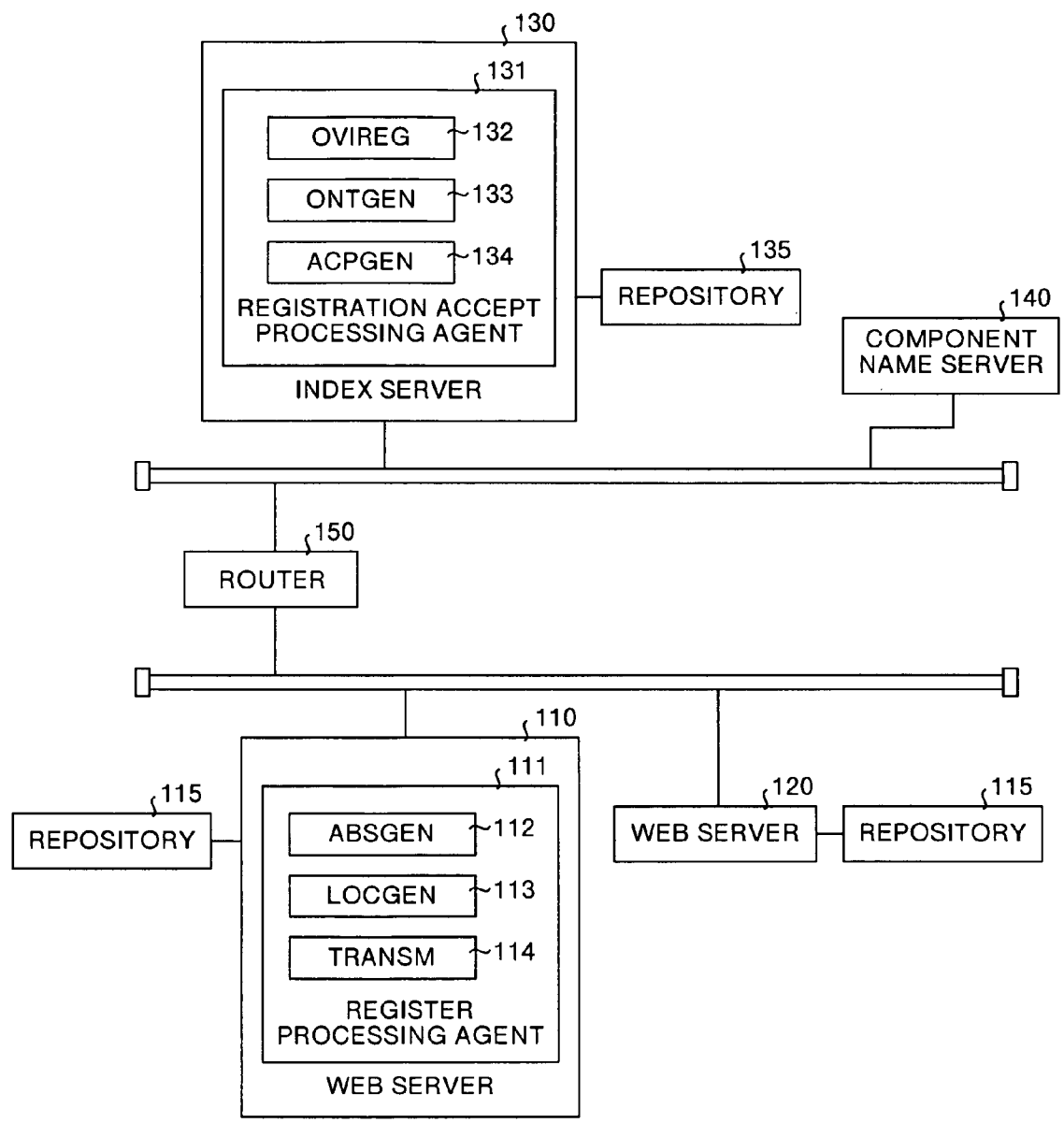
FIG. 1 is a block diagram showing a system structure of an information retrieving system relating to an embodiment of the present invention.

First, a system structure of an information retrieving system and architecture of the whole system relating to the present embodiment will be explained. FIG. 1 is a block diagram showing a system structure of an information retrieving system relating to the present embodiment. When a user wants to retrieve design/manufacturing information of a great variety of file formats registered in the plurality of web servers 110 or 120, the information retrieving system shown in FIG. 1 works as follows. The information retrieving system enables the user to promptly retrieve location information of each design/manufacturing information in a web server 110 or 120 by referring to an index server 130 disposed at the center of the system.

In order to make it possible to achieve this information retrieval, the information retrieving system employs the following architecture. First, (1) a simple icon is provided in advance. When an information-retrieving user drops design/manufacturing information that the user wants to register onto this icon, an ontological document hierarchical structure is provided.

Further, (2) a method of generating a multimedia abstract is provided, so that a general-purpose abstract that is beyond the kinds of document/drawing information preparation tools is automatically generated. Further, (3) an agent for registering the design/manufacturing information is used to improve web traffics.

Further, (4) a repository for the abstract of the design/manufacturing information and the storage location information capable of bridging between various servers is provided. The agent carries out the information communications. Further, (5), retrieving means according to the operation process, for example, is provided, thereby to improve the retrieving method.

A system structure of the information retrieving system relating to the present embodiment will be explained next. As shown in FIG. 1, this information retrieving system has the plurality of web servers 110 and 120, an index server 130, and a component name server 140, connected via a router 150.

The web servers 110 and 120 are the servers that provide the stored design information to users via a WEB SERVER (World Wide Web) as a distributed system on the Internet. Each of the web servers 110 and 120 is built in with a register processing agent 111.

The register processing agent 111 has an abstract generation (ABSGEN) 112 that is started during an idle time after a document has been registered, and that automatically generates a registration document. The register processing agent 111 further has a location generator (LOCGEN) 113 that generates an URL as a storage location of a registered document, and a transmission (TRANSM) 114 that transfers a storage location and an abstract of a registered document to the index server 130 during an idle time.

The register processing agent 111 stores the abstract and the storage information of the registered information into a repository 115, and transfers the abstract and the storage information to the index server 130 by utilizing an idle time of the web server 110 or 120.

The index server 130 is built in with a registration accept processing agent 131 for carrying out a registration acceptance processing. This registration accept processing agent 131 has an overview index register (OVIREG) 132 that stores information relating to a registered document into a repository 135 during an idle time. The registration accept processing agent 131 further has an ontological restructuring (ONTGEN) 133 that restructures the consistency of the ontology of the hierarchical structure, and an accept signal generator (ACPGEN) 134 that posts to the web server a fact that information has been registered into the index server 130.

The component name server 140 is a server that stores product development codes, a list of terms, a list of abbreviations, units, software manuals, hardware manuals, personnel and organization information, E-mail information and the like. When an information retrieval request has been received from an information-retrieving user, the component name server 140 provides various kinds of information to the index server 130.

Next, the generation of an abstract from multimedia by the ABSGEN 112 shown in FIG. 1 will be explained. The information provided by the web servers 110 and 120 includes a great variety of design/manufacturing information such as characters, drawings and images.

Figure 2:
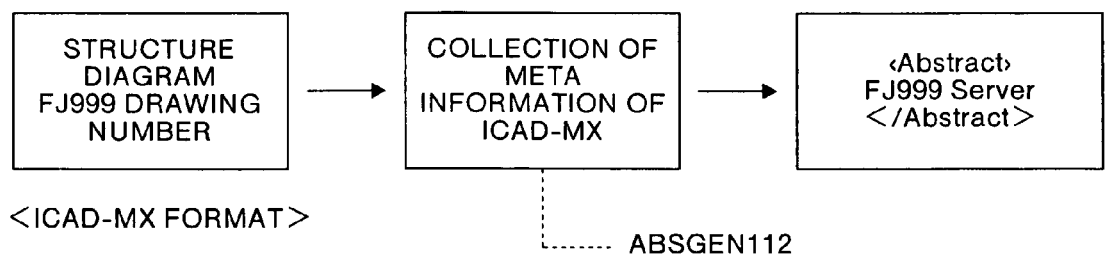
FIG. 2 is a diagram for explaining a generation of an abstract from a structure diagram of an ICAD-MX format.

In order to retrieve these information, it is essential to utilize an abstract that has been expressed by a standard language (XML). Therefore, as shown in FIG. 2, the ABSGEN 112 collects meta information of the ICAD-MX from a structure diagram FJ999 of the ICAD-MX format, thereby to generate an abstract.

Specifically, the ABSGEN 112 automatically recognizes that the file format has been designed by the ICAD-MX tool, converts the ICAD-MX file into a text file as a standard document, and searches and collects a character string given to the structure portion. This drawing number is a structured drawing number system that has ontological characteristics of upper-layer and lower-layer structures. Therefore, the ABSGEN 112 enriches the contents of the own abstract by citing the diagram of the high and low hierarchy.

Figure 3:
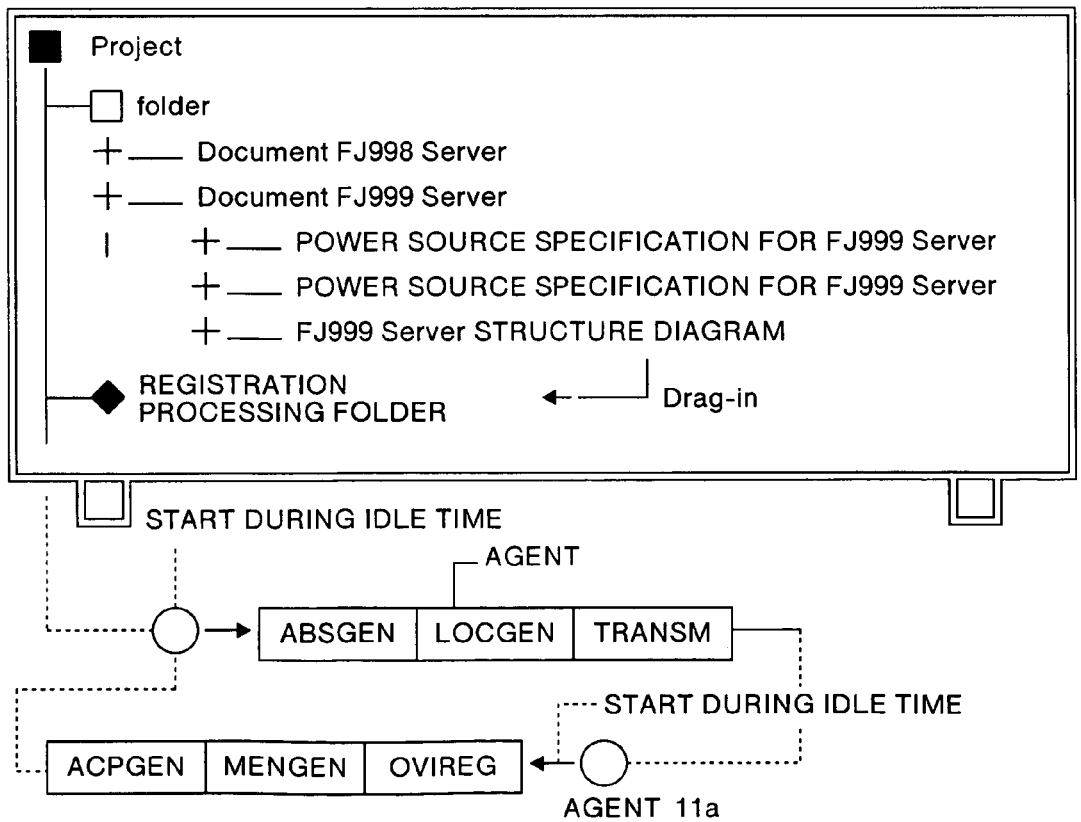
FIG. 3 is a diagram for explaining a registration starting operation by a user and a registration processing by a register processing agent.

Next, a registration procedure by a user and a registration processing by the register processing agent 111 will be explained. FIG. 3 is a diagram for explaining a registration starting operation by the user and the registration processing by the register processing agent.

As shown in FIG. 3, first, a file list is displayed on the display screen, and a registration processing folder for the processing to be carried out by the register processing agent 111 is displayed on the display screen. Then, in the case of registering an FJ999 server structure diagram, for example, this structure diagram is dragged to the registration processing folder and drops it.

When the registration has been carried out in the manner as described above, the register processing agent 111 is put into a queue, so that the register processing agent 111 is started during an idle time. Specifically, first, the ABSGEN 112 automatically generates an abstract, and then the LOCGEN 113 generates storage information. Thereafter, the TRANSM 114 that transfers the abstract and the storage information is put into a queue.

When an idle time has been found, the registration accept processing agent 131 is started. Then, the OVIREG 132 stores the abstract and the storage information into the repository 135 of the index server 130, and the ONTGEN 133 restructures the ontology hierarchical structure. Then, the ACPGEN 134 posts to the registration originator web server 110 or 120 a reception signal that shows that the abstract and the storage information have been registered into the index server 130. In this case, communications are carried out between the repository 115 held by the web server 110 or 120 and the repository 135 held by the index server 130 shown in FIG. 1.

Figure 4:
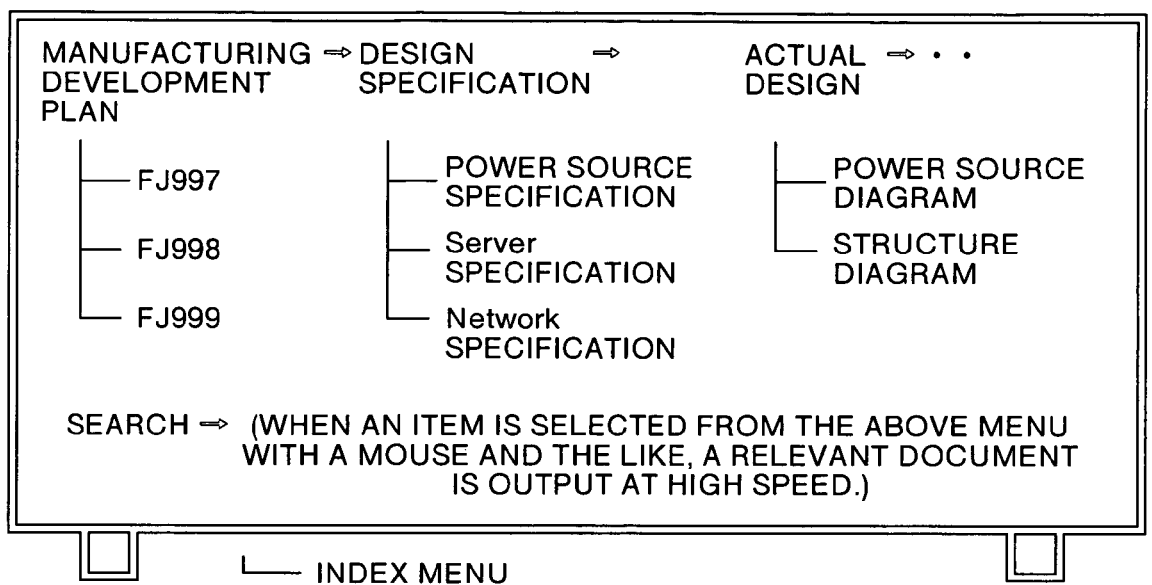
FIG. 4 is a diagram showing one example of an index menu of the information retrieving system shown in FIG. 1.

Next, the index menu of the information retrieving system shown in FIG. 1 will be explained. FIG. 4 is a diagram that shows one example of an index menu of the information retrieving system shown in FIG. 1.

The index menu shown in FIG. 4 is a menu that displays a layout of drawings for each of the design and manufacturing processes of the FJ999 server. When any one desired item is selected from this menu with a mouse, a relevant document is output at high speed.

Specifically, the design and manufacturing processes are classified into "product development plan", "design specification", and "actual design". Then, the product development plan is corresponded to the FJ997, FJ998 or FJ999, the design specification is corresponded to a power source specification, a server specification, and a network specification, and the actual design is corresponded to a power source diagram and a structure diagram.

A description by the XML becomes as follows.
<xml><product development plan>FJ999</product development plan>
<design specification>Server specification</design specification>
<actual design>structure diagram</actual design><xml>

Figure 5:
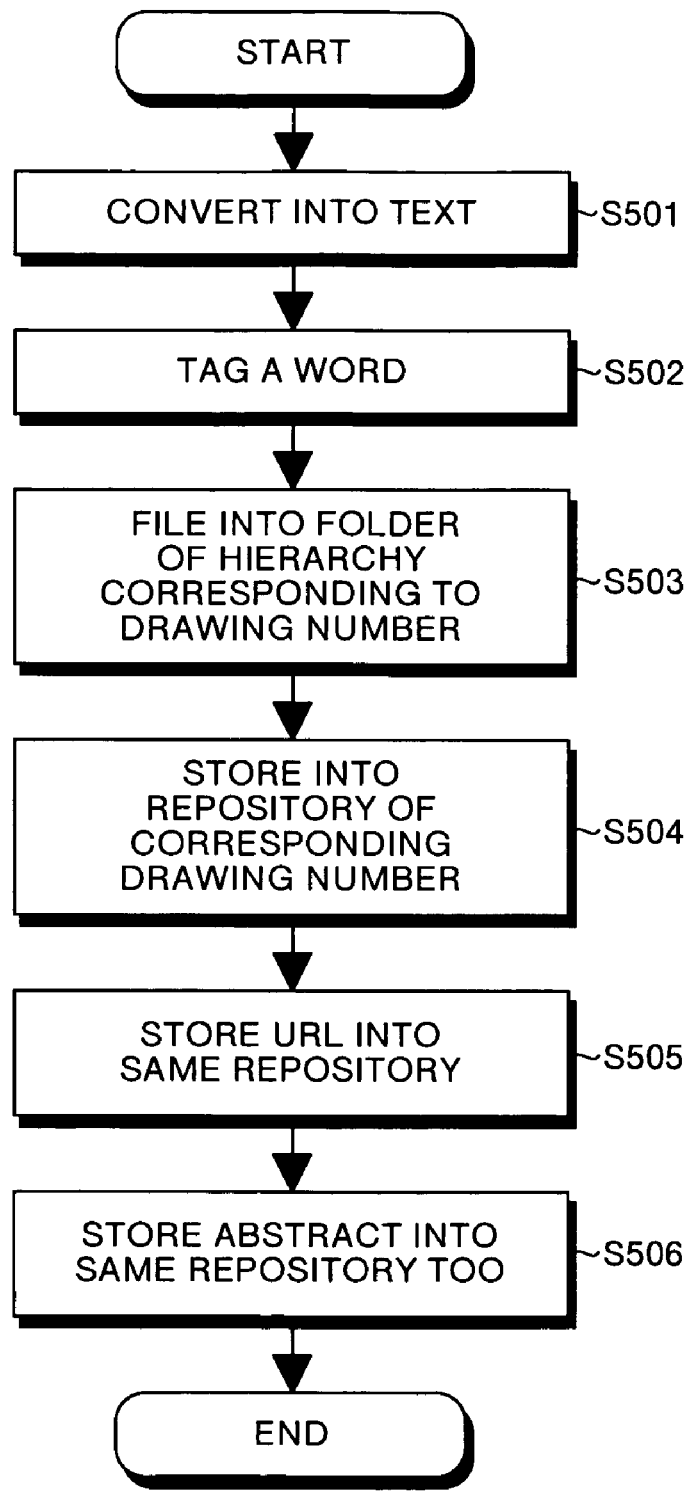
FIG. 5 is a flowchart showing a procedure of a register processing agent shown in FIG. 1.

A procedure of the register processing agent 111 shown in FIG. 1 will be explained next. FIG. 5 is a flowchart showing a procedure of the register processing agent shown in FIG. 1. As shown in FIG. 5, the register processing agent 111 first carries out a text conversion processing for converting a registered document into a text (step S501), and then converts the text into an XML language, and tags each word (step S502).

Then, the register processing agent 111 files the XML language into a folder of the ontology corresponding to the drawing number (step S503), and stores a result into the repository of the corresponding diagram (step S504). For example, when the repository structure of the drawing number is "CAxx-yyy-zzzz" (where xx denotes a directory, yyy denotes a first serial number, and zzzz denotes a second serial number), the register processing agent 111 files the XML language into a folder of a corresponding hierarchy shown by this xx.

Figure 6:
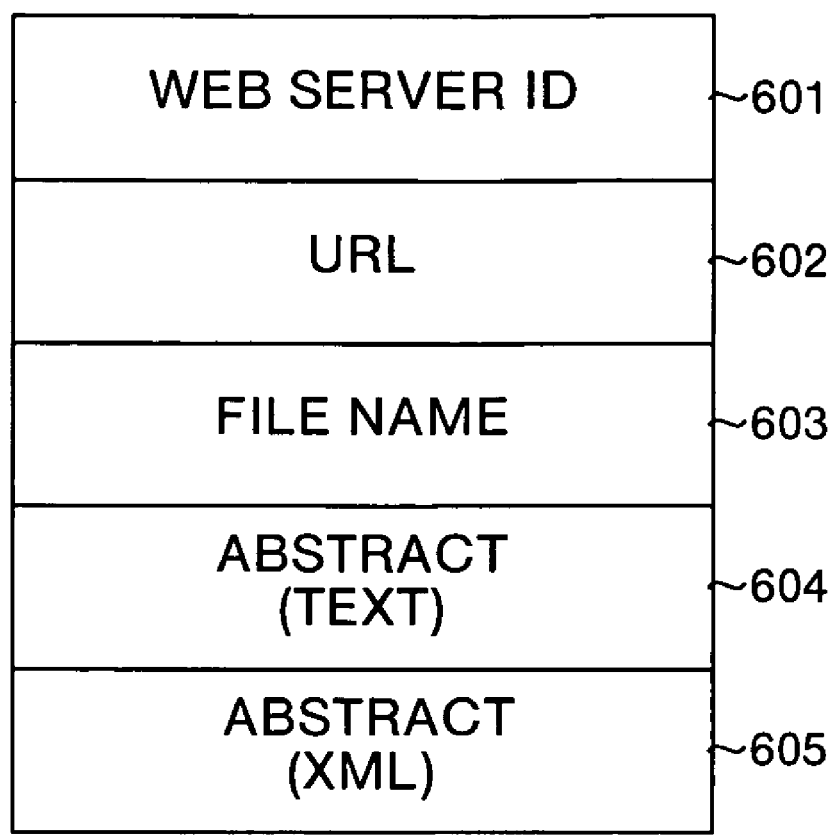
FIG. 6 is a diagram showing one example of a data structure stored in a repository.

Thereafter, the register processing agent 111 stores a URL generated by the LOCGEN 113 into the same repository (step S505), and stores the abstract generated by the ABSGEN 112 into the same repository (step S506). Based on this arrangement, the repository stores data consisting of a web server ID 601, a URL 602, a file name 603, an abstract 604 of the text, and an abstract 605 of the XML, as shown in FIG. 6.

Figure 7:
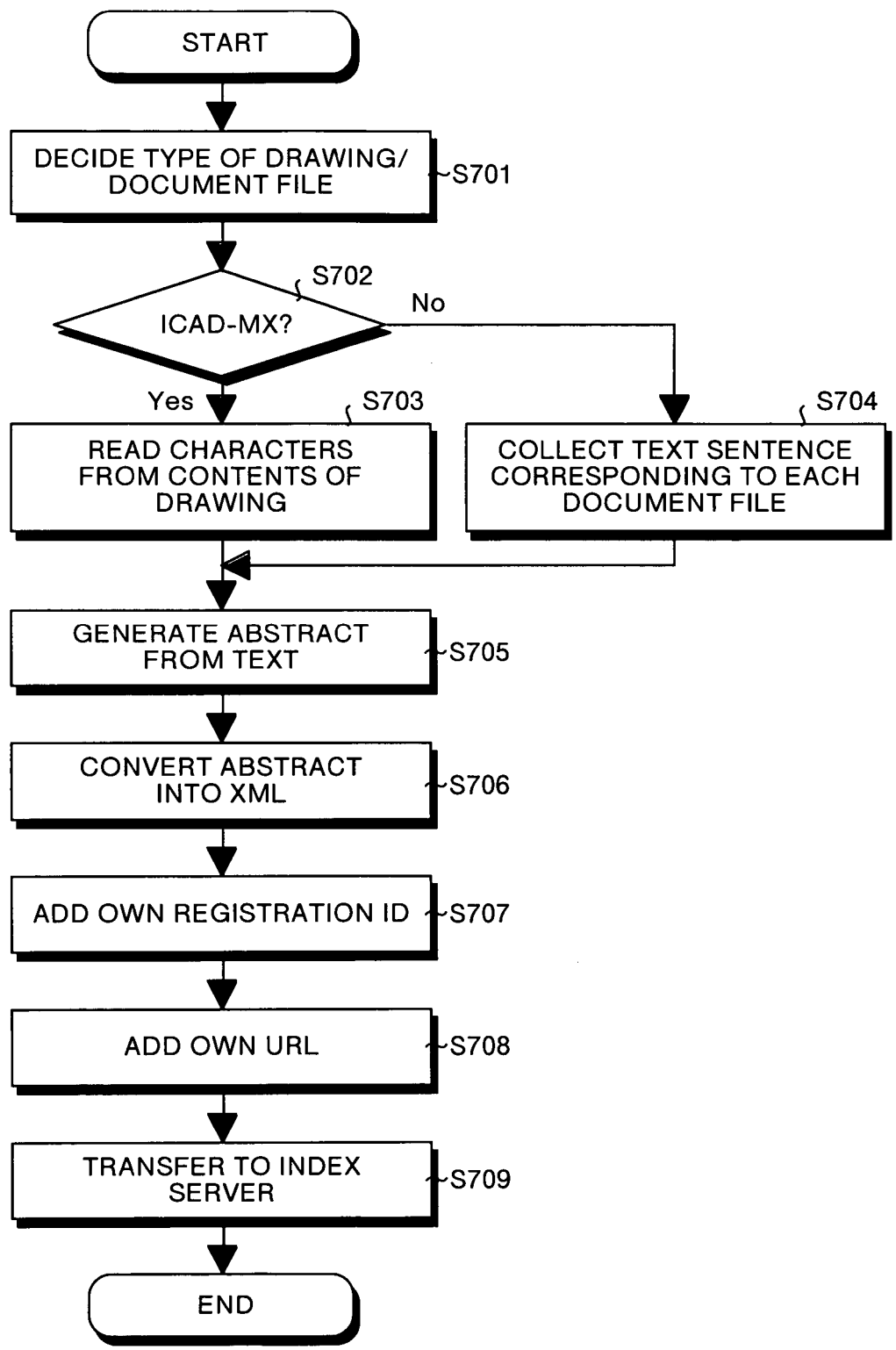
FIG. 7 is a flowchart showing a procedure of a register processing agent when a registration document consists of a drawing file of the ICAD-MX or a document file.

Next, a procedure of the register processing agent 111 when a registered document consists of a drawing file of the ICAD-MX or a document file will be explained. FIG. 7 is a flowchart showing a procedure of the register processing agent 111 when a registration document consists of a drawing file of the ICAD-MX or a document file.

As shown in FIG. 7, the register processing agent 111 decides a type of a drawing or document file (step S701). When the file is the ICAD-MX (Yes at step S702), the register processing agent 111 reads characters from the contents of the drawings (step S703). When the file is not the ICAD-MX (No at step S702), the register processing agent 111 collects a text sentence corresponding to each document file (step S704)

Thereafter, the register processing agent 111 generates an abstract from the text sentence (step S705), converts this abstract into an XML format (step S706), and adds the registration ID and the URL of the web server (steps S707 and S708). During an idle time, the register processing agent 111 transfers the abstract to the index server 130 (step S709).

Figure 8:
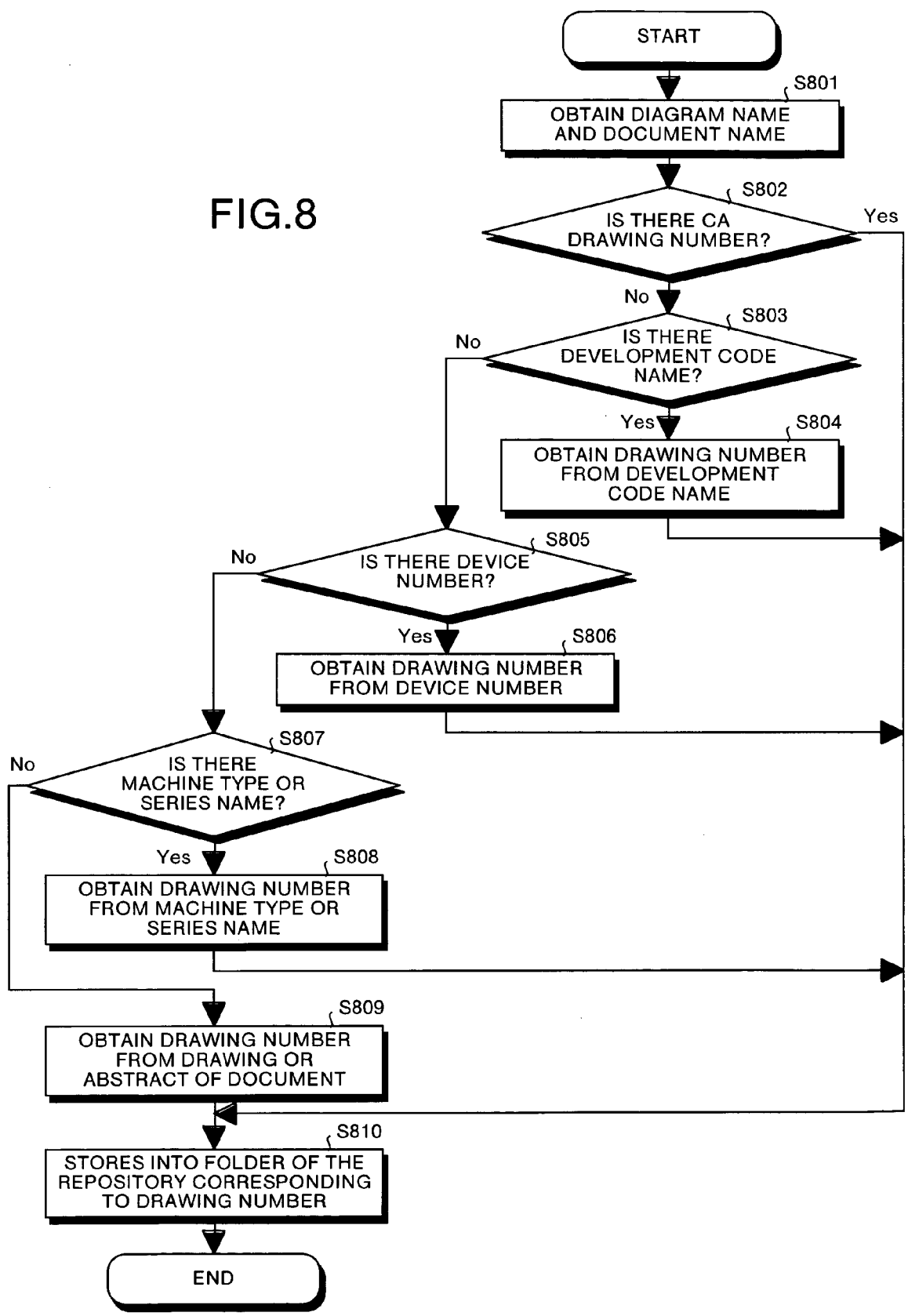
FIG. 8 is a flowchart showing a procedure of a registration accept processing agent shown in FIG. 1.

Next, a procedure of the registration accept processing agent 131 shown in FIG. 1 will be explained. FIG. 8 is a flowchart showing a procedure of the registration accept processing agent 131 shown in FIG. 1. The registration accept processing agent 131 first obtains a drawing name or a document name (step S801), and then confirms whether there is a CA diagram or not (step S802). When there is a CA drawing number (Yes at step S802), the registration accept processing agent 131 stores the CA drawing number into a folder of the repository corresponding to the drawing number (step S810).

On the other hand, when there is no CA drawing number (No at step S802), the registration accept processing agent 131 confirms whether there is a development code name or not (step S803). When there is a development code name (Yes at step S803), the registration accept processing agent 131 obtains a drawing number from this development code name (step S804), and stores the drawing number into a folder of the repository corresponding to the drawing number (step S810).

On the other hand, when there is no development code name (No at step S803), the registration accept processing agent 131 confirms whether there is a device number or not (step S805). When there is a device number (Yes at step S805), the registration accept processing agent 131 obtains a drawing number from this device number (step S806), and stores the drawing number into a folder of the repository corresponding to the drawing number (step S810).

On the other hand, when there is no device number (No at step S805), the registration accept processing agent 131 confirms whether there is a machine type or a series name or not (step S807). When there is a machine type or a series name (Yes at step S807), the registration accept processing agent 131 obtains a drawing number from the machine type or the series name (step S808). Then, the registration accept processing agent 131 stores the drawing number into a folder of the repository corresponding to the drawing number (step S810).

On the other hand, when there is no machine type or series name (No at step S807), the registration accept processing agent 131 obtains a drawing number from the abstract of the drawing or document (step S808). Then, the registration accept processing agent 131 stores the drawing number into a folder of the repository corresponding to the drawing number (step S810).

Figure 9:
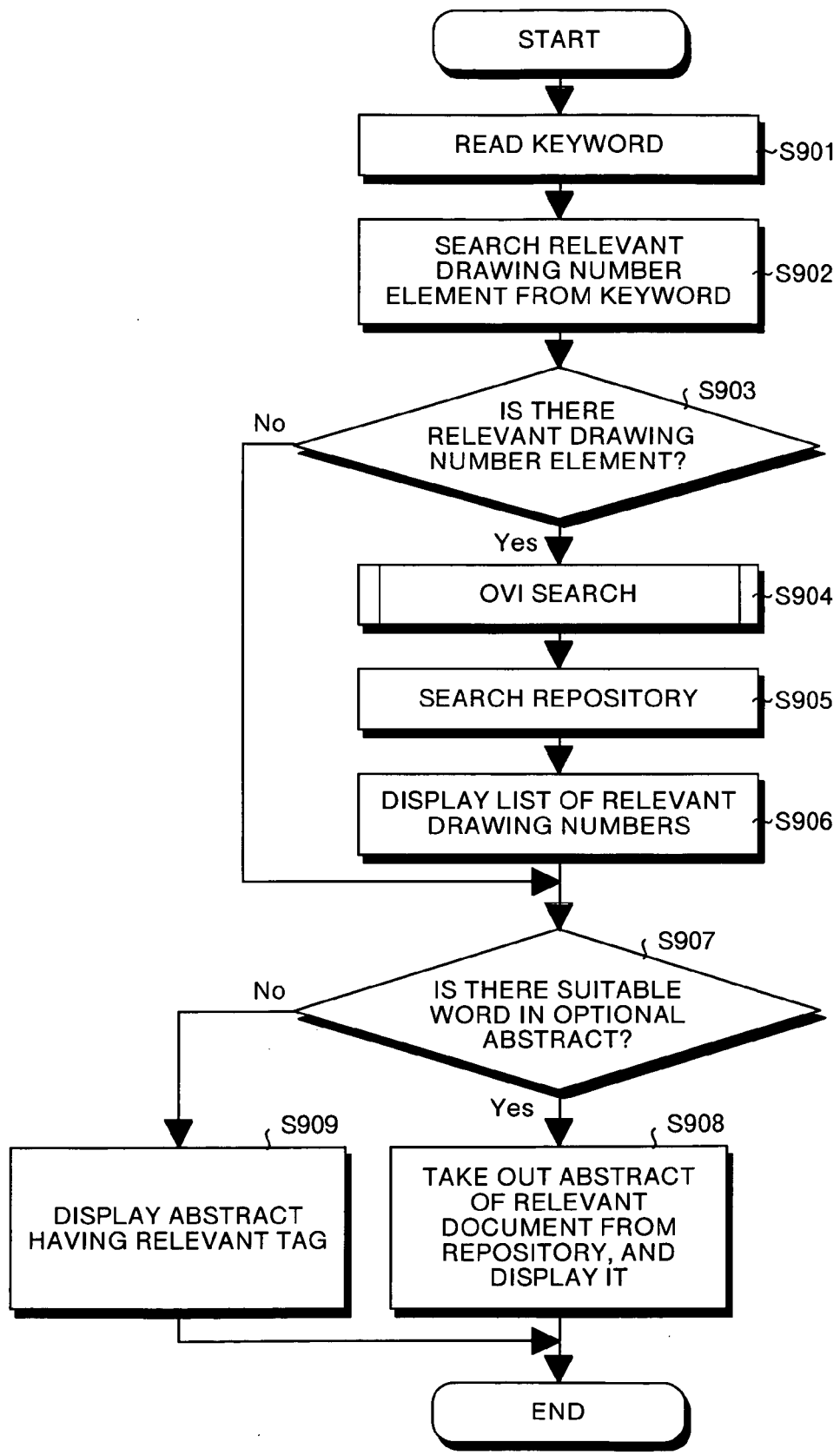
FIG. 9 is a flowchart showing a procedure when the information retrieving system shown in FIG. 1 retrieves an abstract.

Next, a procedure for retrieving an abstract by the information retrieving system shown in FIG. 1 will be explained. FIG. 9 is a flowchart showing a procedure when the information retrieving system shown in FIG. 1 retrieves an abstract.

As shown in FIG. 9, for retrieving an abstract, the information retrieving system first reads a keyword (step S901), and searches a relevant drawing number element from the keyword (step S902). When there is a relevant drawing number element (Yes at step S903), the information retrieving system carries out an overview index search (an OVI search) to be described later (step S904), then searches a repository (step S905), and displays a list of relevant drawing numbers (step S906). When there is no relevant drawing number element (No at step S903), the information retrieving system proceeds straight to step S907.

Then, the information retrieving system confirms whether there is a suitable word in an optional abstract or not (step S907). When there is a suitable word (Yes at step S907), the information retrieving system reads the abstract of a relevant document from the repository, and displays the abstract (step S908). When there is no suitable word (No at step S907), the information retrieving system displays an abstract having a relevant tag (step S909).

Figure 10:
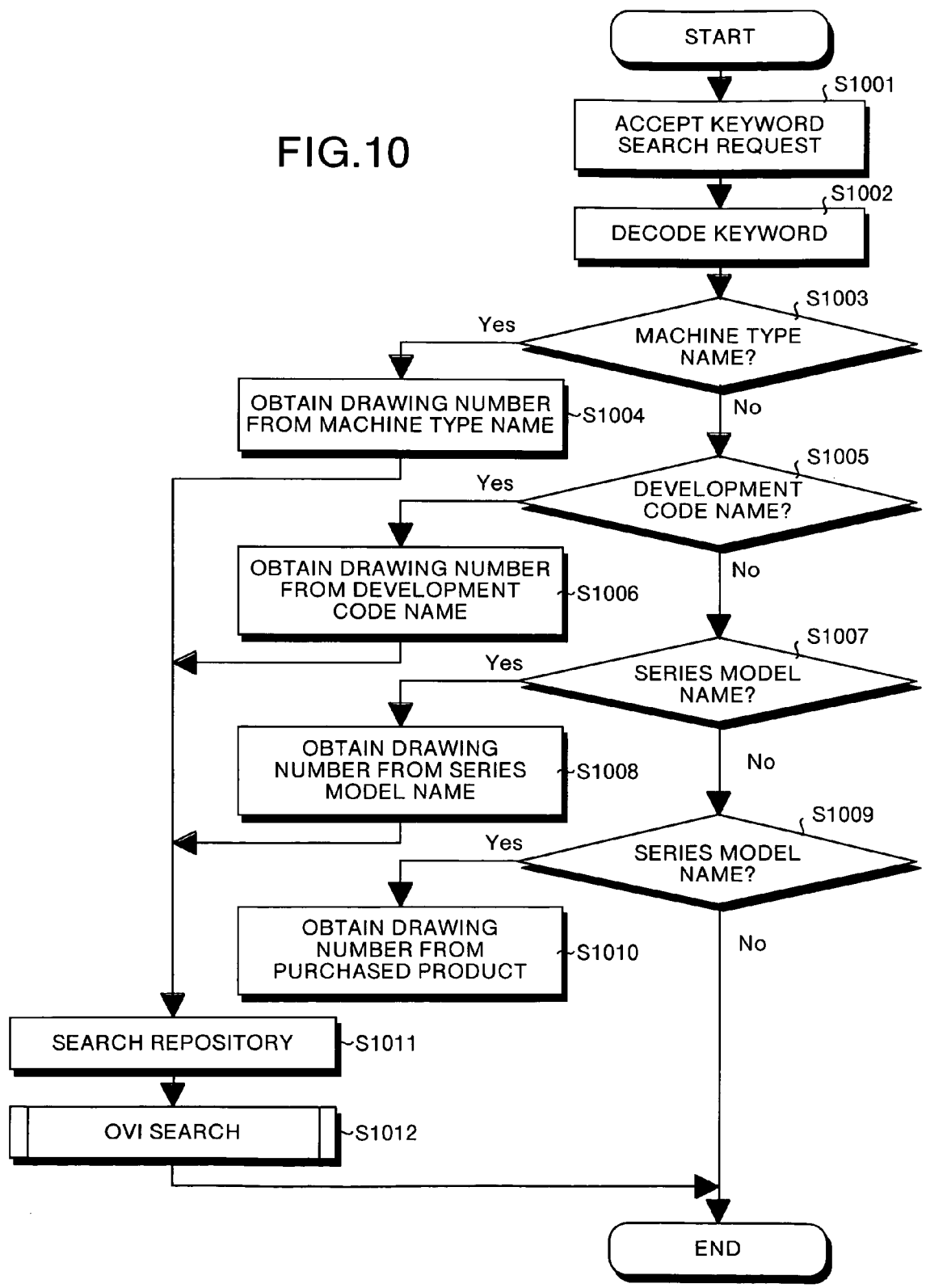
FIG. 10 is a flowchart showing a procedure when the information retrieving system shown in FIG. 1 retrieves a keyword.

Next, a procedure for retrieving a keyword by the information retrieving system shown in FIG. 1 will be explained. FIG. 10 is a flowchart showing a procedure when the information retrieving system shown in FIG. 1 retrieves a keyword.

As shown in FIG. 10, when the information retrieving system has accepted a request for retrieving a keyword (step S1001), the information retrieving system decodes this keyword (step S1002). When the keyword is a machine type name (Yes at step S1003), the information retrieving system obtains a drawing number from this machine type name (step S1004), searches the repository (step S1011), and carries out an overview index search (an OVI search) to be described later (step S1012).

On the other hand, when the keyword is not a machine type name (No at step S1003), and the keyword is a development code name (Yes at step S1005), the information retrieving system obtains a drawing number from this development code name (step S1006). Then, the information retrieving system searches the repository (step S1011), and carries out the OVI search (step S1012).

On the other hand, when the keyword is not a development code name (No at step S1005), and the keyword is a series model name (Yes at step S1007), the information retrieving system obtains a drawing number from this series model name (step S1008). Then, the information retrieving system searches the repository (step S1011), and carries out the OVI search (step S1012).

On the other hand, when the keyword is not a series model name (No at step S1007), and the keyword is a purchased product (Yes at step S1009), the information retrieving system obtains a drawing number from this purchased product (step S1010). Then, the information retrieving system searches the repository (step S1011), and carries out the OVI search (step S1012). When the key word is not a purchased product either (No at step S1009), the information retrieving system finishes the processing.

Figure 11:
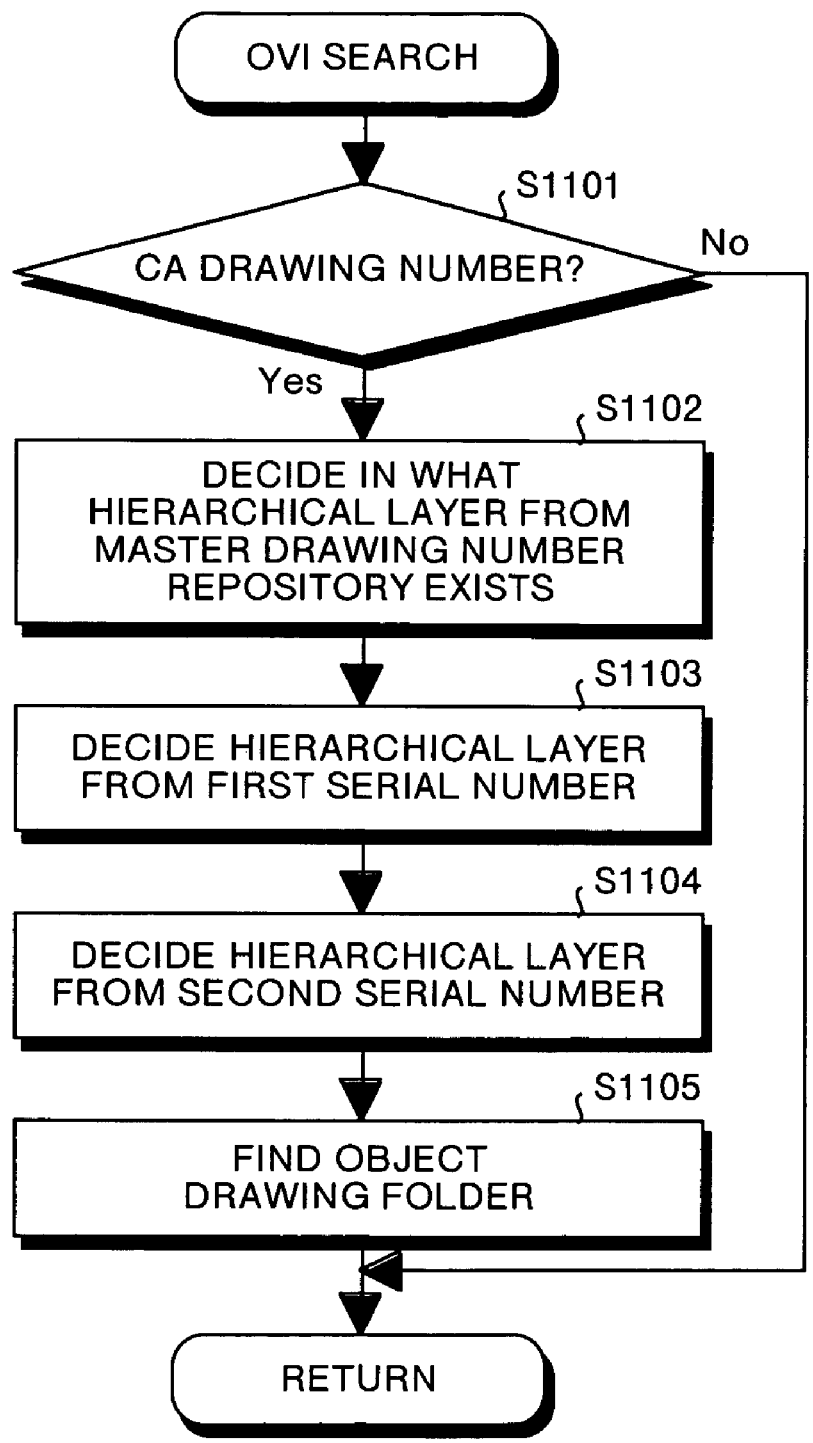
FIG. 11 is a flowchart showing a procedure of an OVI search shown at step S904 in FIG. 9 and at step S1012 in FIG. 10 respectively.

Next, the procedure of the OVI search shown at step S904 in FIG. 9 and at step S1012 in FIG. 10 respectively will be explained. FIG. 11 is a flowchart showing a procedure of the OVI search shown at step S904 in FIG. 9 and at step S1012 in FIG. 10 respectively.

As shown in FIG. 11, in the OVI search, when a CA drawing number is to be searched (Yes at step S1101), the information retrieving system makes a decision about in what hierarchical layer from a master drawing number the repository exists (step S1102). The information retrieving system decides a hierarchical layer from the first serial number and the second serial number (steps S1103 and S1104), and finds a drawing number folder of an object (step S1105). When a CA drawing number is not to be searched (No at step S1101), the information retrieving system finishes the processing.

Figure 12:
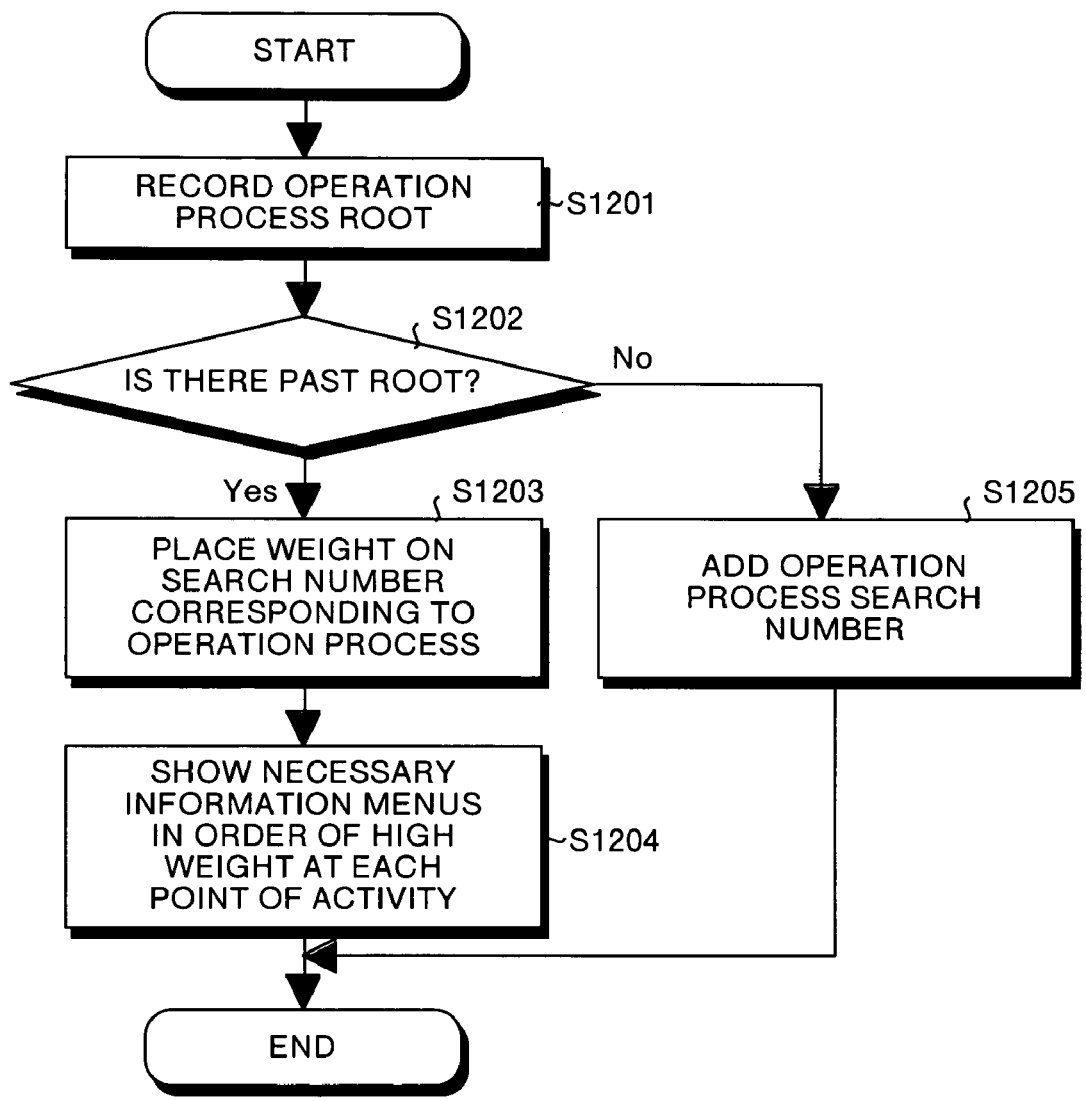
FIG. 12 is a flowchart showing a procedure when the information retrieving system shown in FIG. 1 retrieves an operation process.

Next, a procedure for retrieving an operation process by the information retrieving system shown in FIG. 1 will be explained. FIG. 12 is a flowchart showing a procedure when the information retrieving system shown in FIG. 1 retrieves an operation process.

As shown in FIG. 12, for retrieving an operation process, the information retrieving system records an operation process root (step S1201), and confirms whether there exists a past root or not (step S1202).

When there does not exit a past root (No at step S1202), the information retrieving system adds an operation process retrieval number (step S1205), and finishes the processing. When there exists a past root (Yes at step S1202), the information retrieving system places a weight on a retrieval number corresponding to the operation process (step S1203), and then shows necessary information menus in the order of high weight at each point of activity (step S1204).

Figure 13:
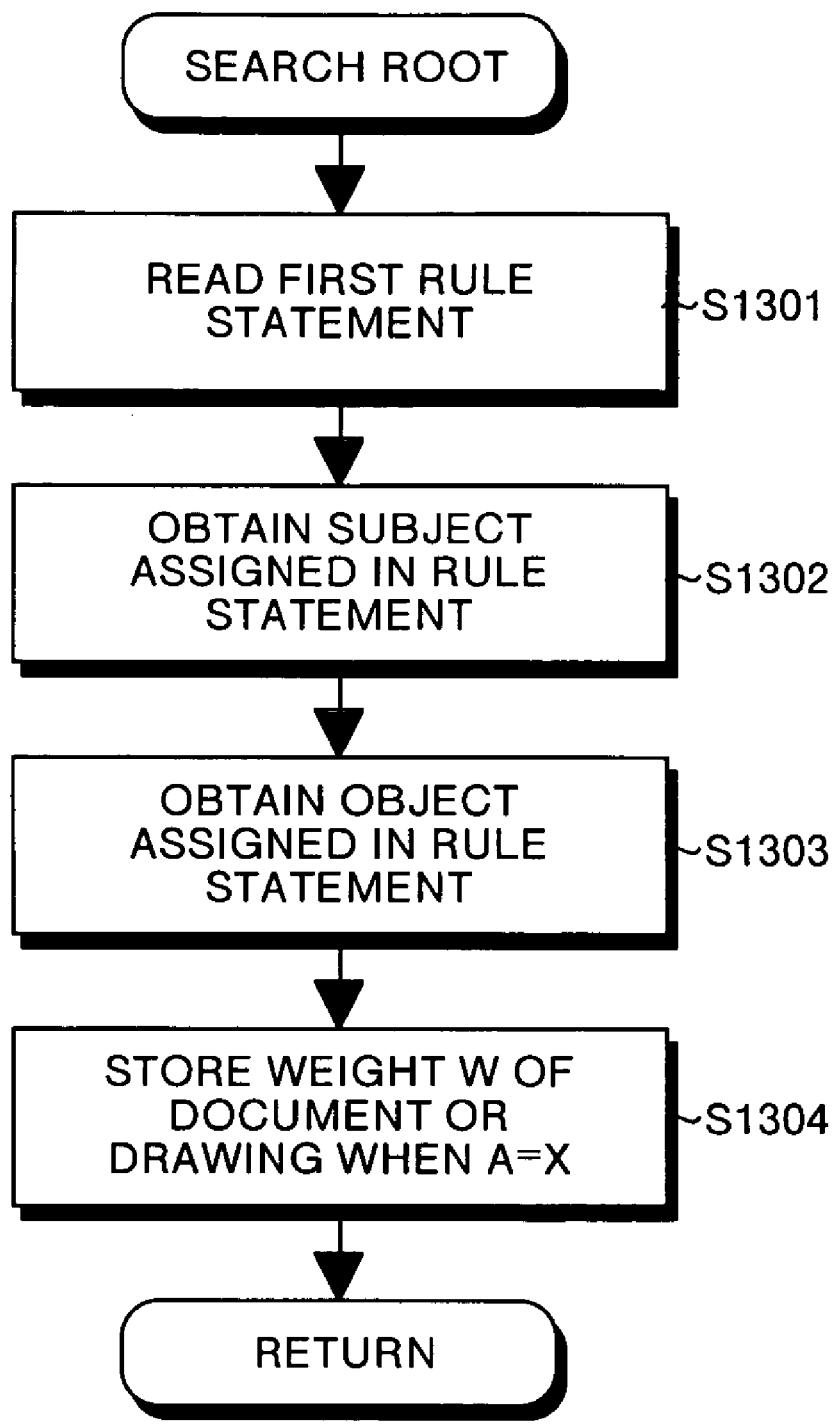
FIG. 13 is a flowchart showing a procedure when the information retrieving system shown in FIG. 1 retrieves a rule.

Next, a procedure for retrieving a rule by the information retrieving system shown in FIG. 1 will be explained. FIG. 13 is a flowchart showing a procedure when the information retrieving system shown in FIG. 1 retrieves a rule. In this case, it is assumed that the information retrieving system retrieves a rule of "IF A=x then DO XXX".

As shown in FIG. 13, for retrieving a rule, the information retrieving system reads a first rule statement (step S1301), and obtains a subject A assigned in this rule statement (step S1302).

Thereafter, the information retrieving system obtains an object x assigned in the rule statement (step S1303), and stores the weight of a document or a drawing number into the repository when the subject A=object x (step S1304).

Next, a procedure for retrieving a keyword by the information retrieving system shown in FIG. 1 will be explained. FIG. 14A, FIG. 14B, FIG. 15A and FIG. 15B are diagrams showing one example of a display screen when the information retrieving system shown in FIG. 1 retrieves a keyword. In this case, it is assumed that the information retrieving system retrieves a design review material of a development plan for a device called "SYDNEY Model2000".

As shown in FIG. 14A, a search starting is instructed by inputting "SYDNEY" as a first keyword, "Model2000" as a second keyword, and "Development plan" as a third keyword of a window 1401 respectively, and by selecting "AND" as a search condition. Then, a result of the searching is obtained.

When a list display is selected on this window 1401, a window 1402 that includes a result of the searching arrayed in the order of high weight is displayed as shown in FIG. 14B. Therefore, "SYDNEY Model2000 Development plan" is selected as a first category, and a key word of "Design review" is assigned on the window 1402, and a search starting is instructed. Then, a window 1403 shown in FIG. 15A is displayed.

Therefore, "SYDNEY Model2000 Design review" is selected on this window 1403, and a search starting is instructed. As a result, a window 1404 that displays a corresponding design review is displayed on the screen as shown in FIG. 15B.

Figure 16A:
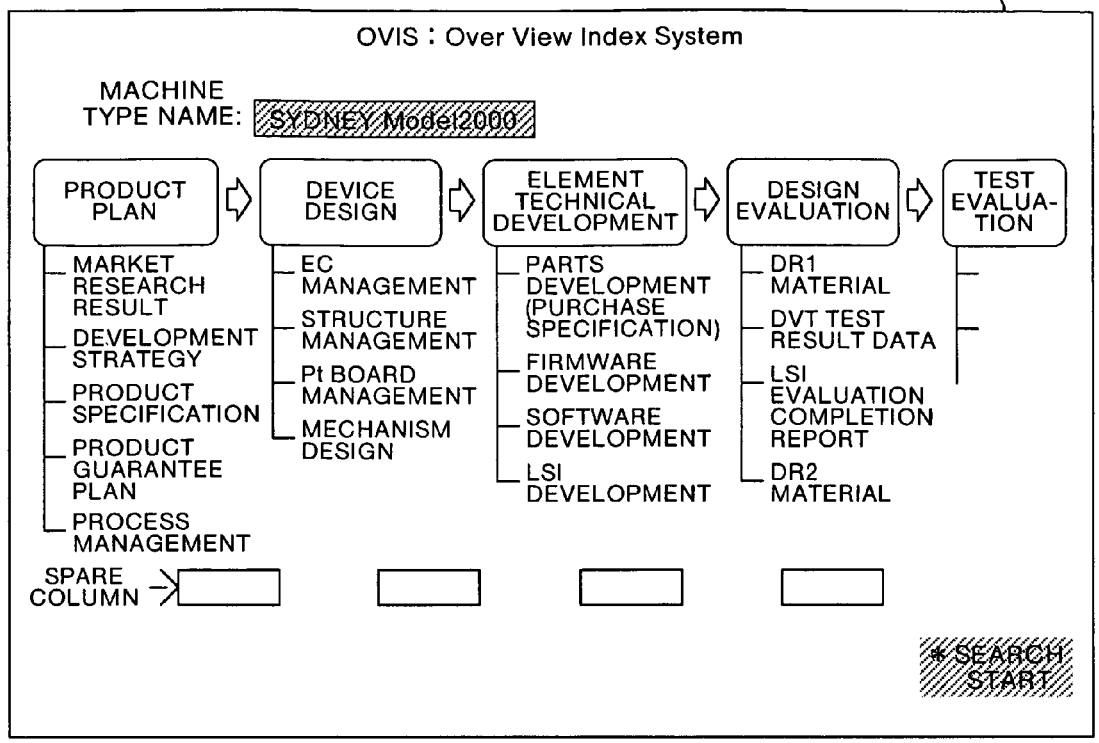
FIG. 16A and FIG. 16B are diagrams showing one example of a display screen when the information retrieving system shown in FIG. 1 retrieves a life cycle.
Figure 16B:
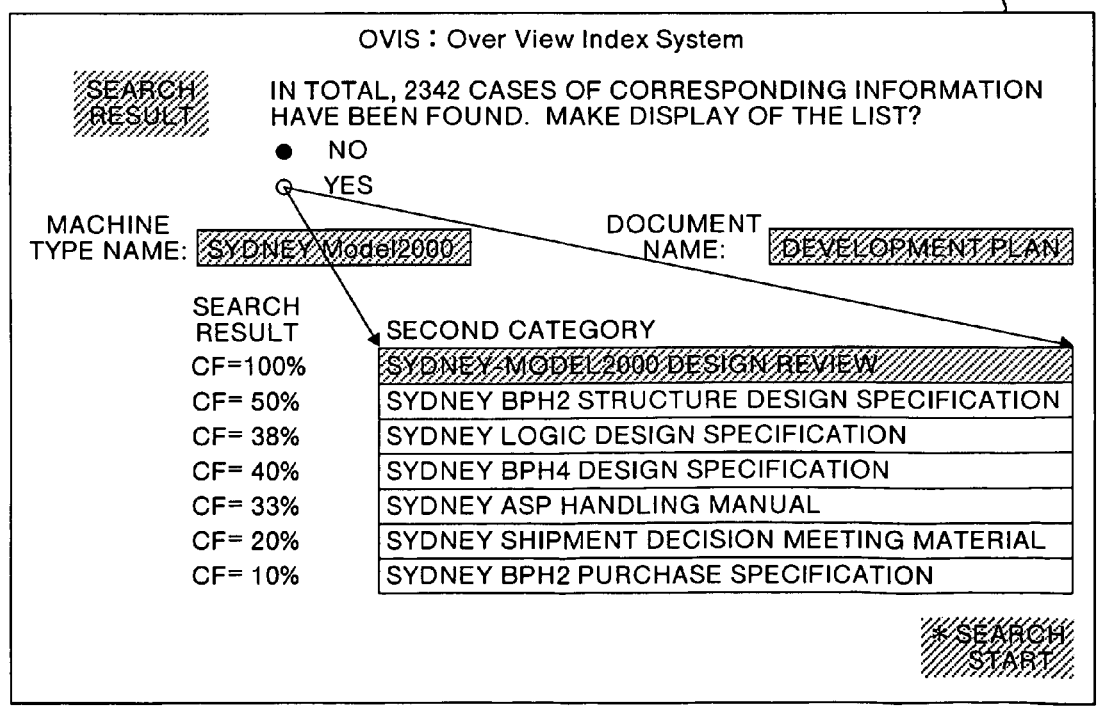
Figure 17:
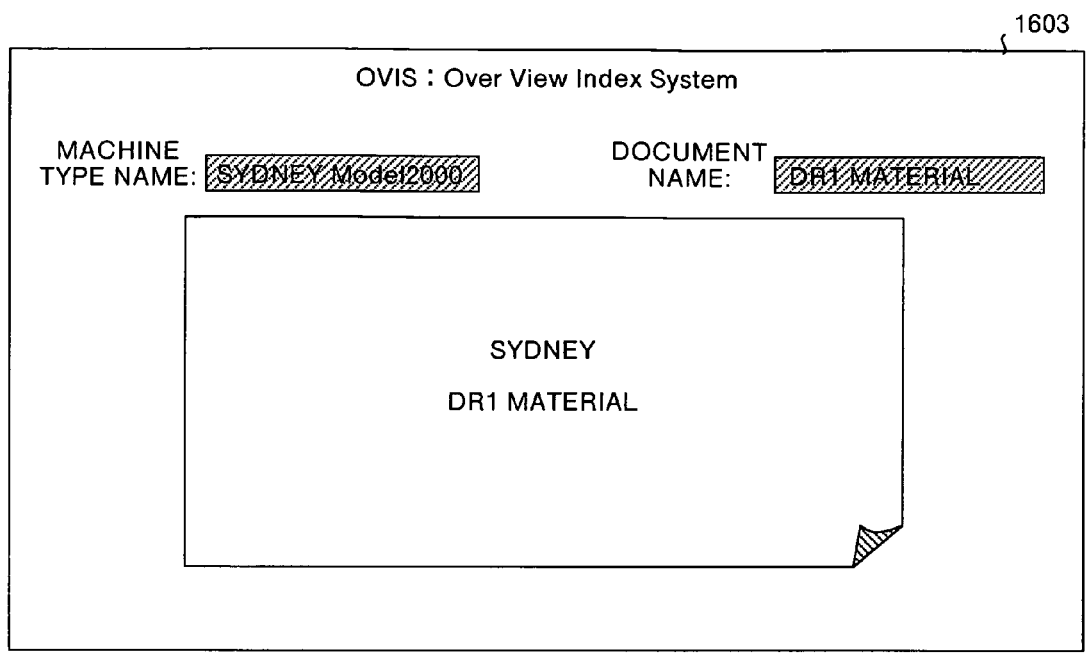
FIG. 17 is a diagram showing one example of a display screen when the information retrieving system shown in FIG. 1 retrieves a life cycle.

Next, a procedure for retrieving a life cycle by the information retrieving system shown in FIG. 1 will be explained. FIG. 16A, FIG. 16B and FIG. 17 are diagrams showing one example of a display screen when the information retrieving system shown in FIG. 1 retrieves a life cycle. In this case, it is also assumed that the information retrieving system retrieves a design review material of a development plan for a device called "SYDNEY Model2000".

As shown in FIG. 16A, "SYDNEY Model2000" is input in the column of a machine type name, "DRI material" is selected within "Design evaluation" on a window 1601, and a search starting is instructed. Then, a window 1602 as shown in FIG. 16B is displayed.

Therefore, a second category "SYDNEY Model2000 Design review" is selected on this window 1602, and a search starting is instructed. As a result, a window 1603 that displays a corresponding design review is displayed as shown in FIG. 17.

Figure 18A:
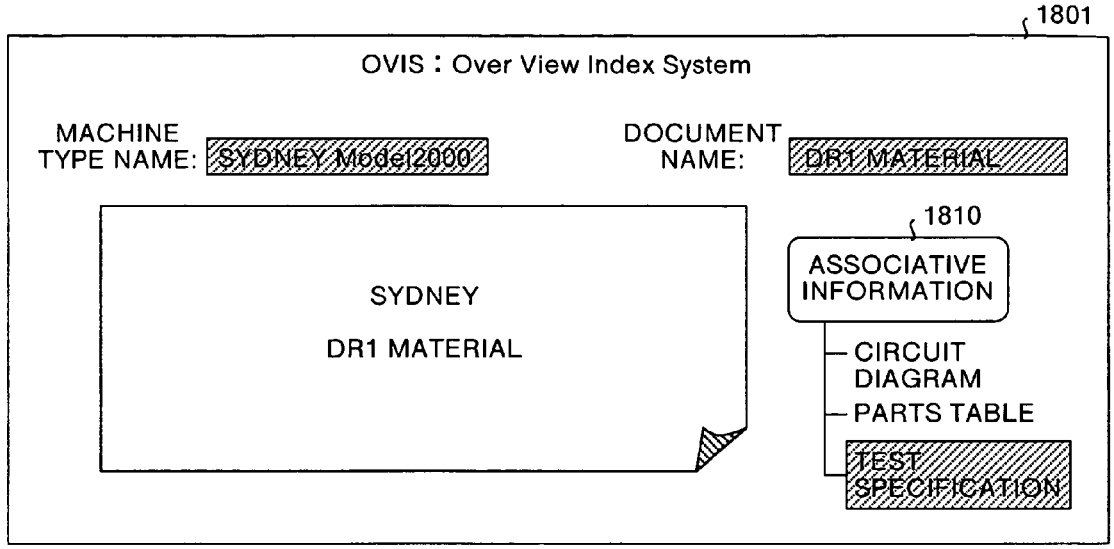
FIG. 18A to FIG. 18C are diagrams showing one example of a display screen when the information retrieving system shown in FIG. 1 retrieves an operation process association.
Figure 18B:
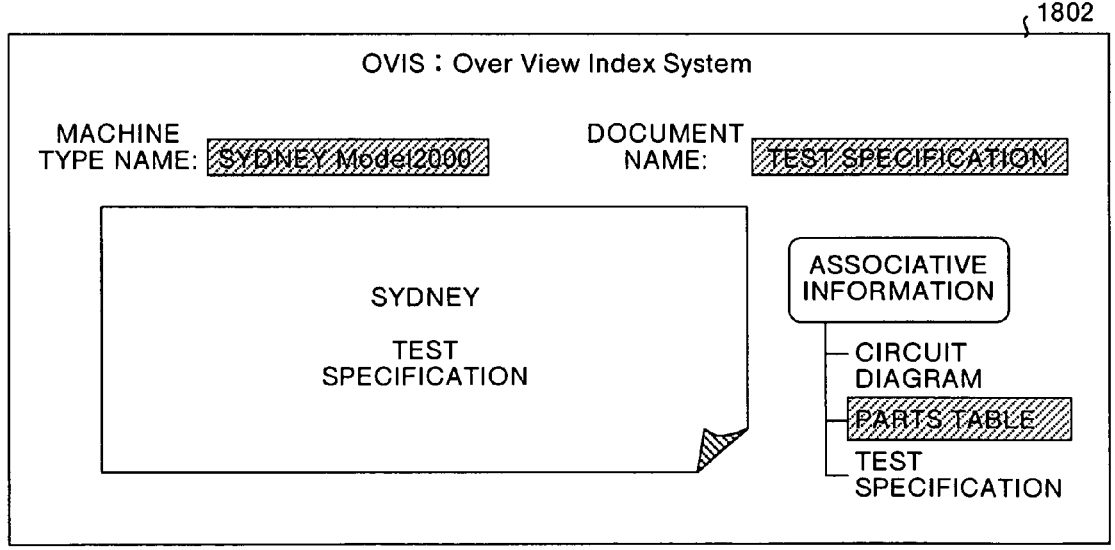
Figure 18C:
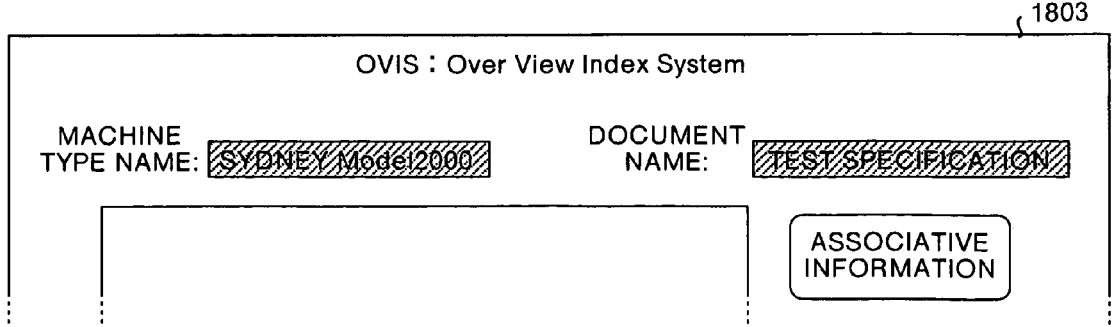

Next, a procedure for retrieving an operation process association by the information retrieving system shown in FIG. 1 will be explained. FIG. 18A to FIG. 18C are diagrams that show one example of a display screen when the information retrieving system shown in FIG. 1 retrieves an operation process association. In this case, it is also assumed that the information retrieving system retrieves a design review material of a development plan for a device called "SYDNEY Model2000".

When an input frame 1810 of associative information is instructed on a window 1801 shown in FIG. 18A, ten items of high order on the information based on the past search record including "Circuit diagram", "Parts table", and "Test specification", are displayed.

When "Test specification" is selected, a window 1802 that includes the test specification as display contents is displayed as shown in FIG. 18B. Next, when "Parts table" is selected, a window 1803 that includes a table of parts as display contents is displayed as shown in FIG. 18C.

Figure 19A:
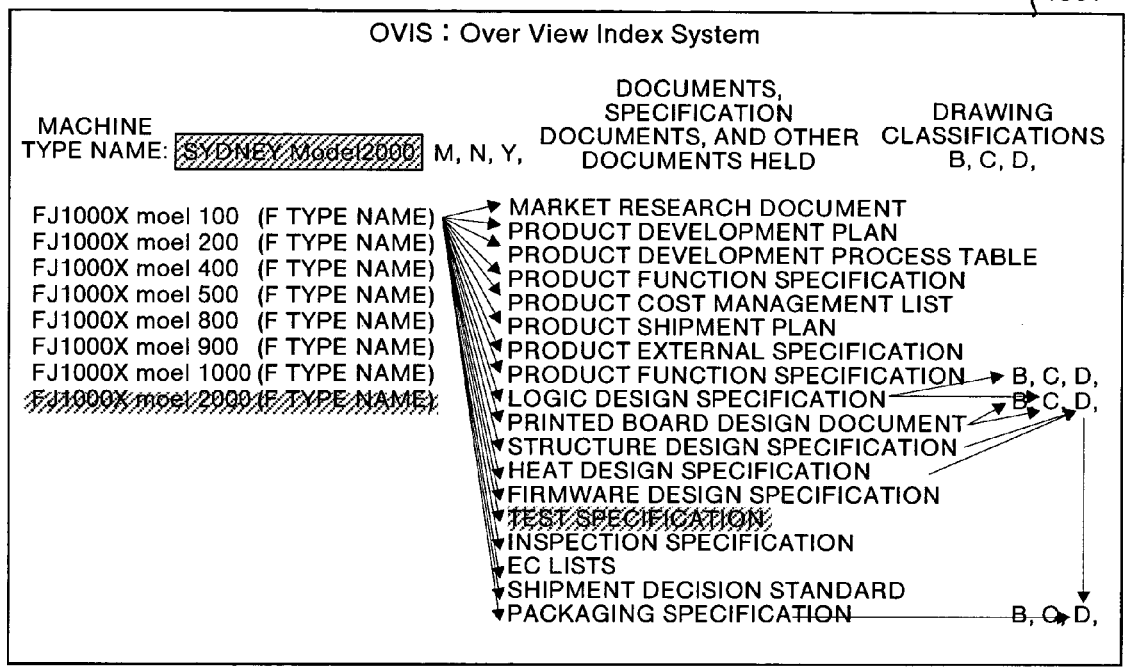
FIG. 19A and FIG. 19B are diagrams showing one example of a display screen when the information retrieving system shown in FIG. 1 retrieves an overview index.
Figure 19B:
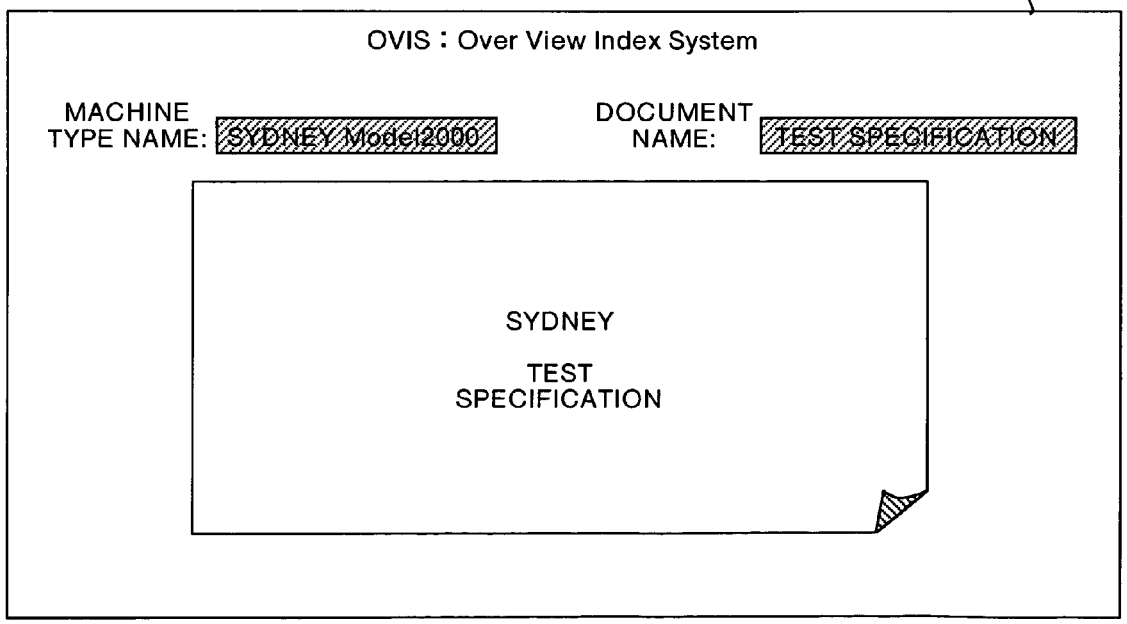
Figure 20:
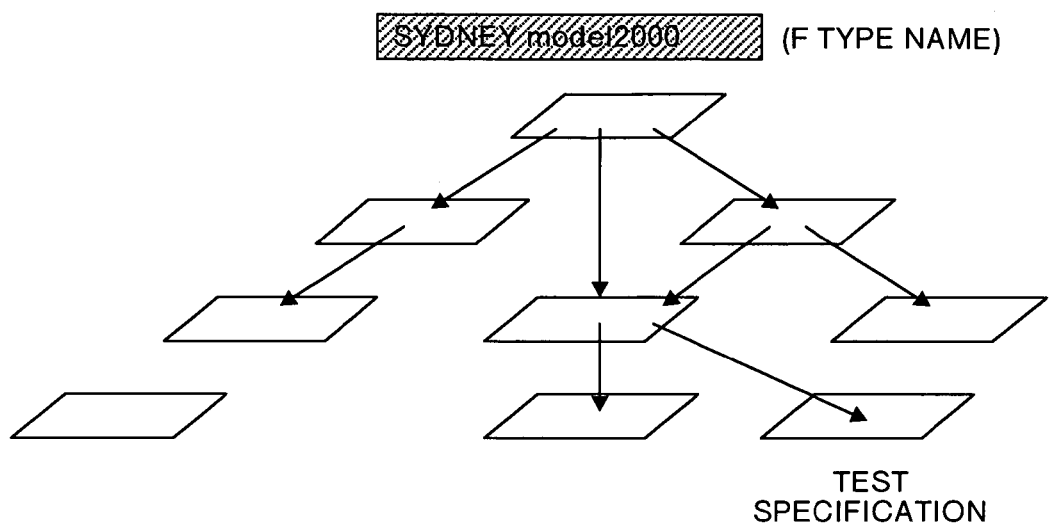
FIG. 20 is a diagram showing one example of a hierarchical structure of documents and drawings.

Next, a procedure for retrieving an overview index by the information retrieving system shown in FIG. 1 will be explained. FIG. 19A and FIG. 19B are diagrams that show one example of a display screen when the information retrieving system shown in FIG. 1 retrieves an overview index. FIG. 20 is a diagram that shows one example of a hierarchical structure of documents and drawings. In this case, it is also assumed that the information retrieving system retrieves a design review material of a development plan for a device called "SYDNEY Model 2000".

When "FJ1000X model2000 (F type name)" and "Test specification" are selected on a window 1901 shown in FIG. 19A, a window 1902 that includes the test specification as display contents is displayed as shown in FIG. 19B.

Specifically, this "FJ1000X model2000 (F type name)" has a hierarchical structure as shown in FIG. 20, and the test specification is one of its leaves. Therefore, when "Test specification" has been selected on the window 1901, this hierarchical structure is traced to reach "Test specification", and the window 1902 is displayed as a result.

As described above, according to the present embodiment, in order to retrieve the design/manufacturing information registered in the plurality of web servers 110 or 120, the index server 130 is provided in the information retrieving system. Then, the register processing agent 111 delivers the abstract and the storage location of the registered information of the web servers, to the registration accept processing agent 131. Therefore, it is possible to efficiently automatically register the information registered in the web servers, into the index server 130. As a result, it is possible to enable the web servers to retrieve the information promptly and efficiently.

In the present embodiment, two web servers are used for the sake of convenience of the explanation. However, the number of the web servers is not limited to two, and it is also possible to use three or more web servers.

As explained above, according to one aspect of this invention, an abstract and storage location information of design/manufacturing information registered in the plurality of web servers, are transmitted to an index server during an idle time of the web servers. Further, the abstract and storage location information that have been transmitted are automatically registered into the index server. Therefore, there is an effect that it is possible to obtain an information retrieving system that can efficiently automatically register the information registered in the plurality of web servers into the index server, thereby to enable information-retrieving users to promptly and efficiently retrieve the information.

Furthermore, an abstract of the design/manufacturing information is generated, and storage location information that shows a storage location of the design/manufacturing information is generated. Then, the abstract and the storage location information are transmitted to the index server during an idle time of the web servers. Therefore, there is an effect that it is possible to obtain an information retrieving system that can efficiently transmit data relating to the design/manufacturing information by utilizing the idle time of the web servers.

Furthermore, an abstract and storage location information are stored in the first repository, and the abstract and the storage location information stored in the first repository are transmitted to the index server during an idle time of the web servers. Therefore, there is an effect that it is possible to obtain an information retrieving system that can efficiently transfer the abstract and the storage location information by using the first repository during the idle time.

Furthermore, an abstract and storage location information of the design/manufacturing information are stored in the second repository during an idle time of the index server. The consistency of the ontology of a hierarchical structure relating to the design/manufacturing information is restructured. Then, a message that the abstract and the storage location information of the design/manufacturing information have been stored in the second repository is posted to the web servers. Therefore, there is an effect that it is possible to obtain an information retrieving system that can retrieve the information based on a hierarchical structure and that can efficiently post the registration of the design/manufacturing information.

Furthermore, the information retrieving system has a bird's-eye view of the design/manufacturing information based on the abstract and the storage location information of the design/manufacturing information registered in the index server. Therefore, there is an effect that it is possible to obtain an information retrieving system that can efficiently retrieve the design/manufacturing information.

According to another aspect of this invention, an abstract and storage location information of design/manufacturing information registered in the plurality of web servers, are transmitted to an index server during an idle time of the web servers. Further, the abstract and storage location information that have been transmitted are automatically registered into the index server. Therefore, there is an effect that it is possible to obtain an information retrieving method that can efficiently automatically register the information registered in the plurality of web servers into the index server, thereby to enable information-retrieving users to promptly and efficiently retrieve the information.

Furthermore, an abstract of the design/manufacturing information is generated, and storage location information that shows a storage location of the design/manufacturing information is generated. Then, the abstract and the storage location information are transmitted to the index server during an idle time of the web servers. Therefore, there is an effect that it is possible to obtain an information retrieving method that can efficiently transmit data relating to the design/manufacturing information by utilizing the idle time of the web servers.

Furthermore, an abstract and storage location information are stored in the first repository, and the abstract and the storage location information stored in the first repository are transmitted to the index server during an idle time of the web servers. Therefore, there is an effect that it is possible to obtain an information retrieving method that can efficiently transfer the abstract and the storage location information by using the first repository during the idle time.

Furthermore, an abstract and storage location information of the design/manufacturing information are stored in the second repository during an idle time of the index server. The consistency of the ontology of a hierarchical structure relating to the design/manufacturing information is restructured. Then, a message that the abstract and the storage location information of the design/manufacturing information have been stored in the second repository is posted to the web servers. Therefore, there is an effect that it is possible to obtain an information retrieving method that can retrieve the information based on a hierarchical structure and that can efficiently post the registration of the design/manufacturing information.

Furthermore, the information retrieving method has a bird's-eye view of the design/manufacturing information based on the abstract and the storage location information of the design/manufacturing information registered in the index server. Therefore, there is an effect that it is possible to obtain an information retrieving method that can efficiently retrieve the design/manufacturing information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information retrieving system for retrieving design/manufacturing information of a variety of file formats registered in a plurality of web servers, by using an index server, said information retrieving system comprising:
    a transmitting unit that transmits the abstract and storage location information of the design/manufacturing information registered in said web servers, to the index server during an idle time of the web servers;
    an automatic registering unit that automatically registers the abstract and storage location information transmitted from said web servers by said transmitting unit, into said index server, wherein
    said transmitting unit is a register processing agent that includes an abstract generating unit for generating an abstract from a text sentence of the design/manufacturing information and transmits the abstract and storage location information of the design/manufacturing information; and
    the index server, comprising:
        a registration accept processing agent to carry out a registration acceptance processing, wherein the registration accept processing agent has an overview index register that stores information relating to a registered document into a repository during an idle time;
        an ontological restructuring unit to restructure a consistency of an ontology of a hierarchical structure; and
        an accept signal generator to post to a web server of the plurality of web servers a fact that information has been registered into the index server.

2. The information retrieving system according to claim 1, wherein said transmitting unit includes,
    a storage location information generating unit that generates storage location information showing a storage location of the design/manufacturing information; and
    an information transmitting unit that transmits an abstract generated by said abstract generating unit and storage location information generated by said storage location information generating unit respectively, to said index server during an idle time of said web servers.

3. The information retrieving system according to claim 2, wherein said abstract generating unit converts the design/manufacturing information into a text, and then converts this text into an XML format, thereby to generate an abstract of the text and the XML format.

4. The information retrieving system according to claim 2, wherein said storage location information generating unit generates URLs as addresses of said web servers on the Internet.

5. The information retrieving system according to claim 2, wherein said information transmitting unit further includes,
    a first repository that stores an abstract generated by said abstract generating unit and storage location information generated by said storage location information generating unit, and transmits the abstract and the storage location information stored in the first repository to said index server during an idle time of said web servers.

6. The information retrieving system according to claim 1, wherein said automatic registering unit is a registration accept processing agent that automatically registers the abstract and the storage location information transmitted from said web servers by said transmitting unit, to said index server.

7. The information retrieving system according to claim 6, wherein said automatic registering unit includes,
   a second repository that stores an abstract and storage location information of the design/manufacturing information that have been transmitted from said transmitting unit;
   a storage unit that stores the abstract and the storage location information of the design/manufacturing information into the second repository during an idle time of said index server;
   an ontology restructuring unit that restructures the consistency of the ontology of a hierarchical structure relating to the design/manufacturing information; and
   a posting unit that posts to said web servers a message that an abstract and storage location information of the design/manufacturing information have been stored in said second repository.

8. The information retrieving system according to claim 7, wherein the abstract and the storage location information of the design/manufacturing information are transferred between said first repository and said second repository by inter-repository communications.

9. The information retrieving system according to claim 1, further comprising an overview unit that has a birds-eye view of the design/manufacturing information based on an abstract and storage location information of the design/manufacturing information registered in said index server.

10. The information retrieving system according to claim 1, further comprising a retrieving unit that retrieves design/manufacturing information based on an abstract and storage location information of the design/manufacturing information registered in said index server.

11. An information retrieving method for retrieving design/manufacturing information of a great variety of file formats registered in a plurality of web servers, by using an index server, the information retrieving method comprising:
   a transmission operation of transmitting an abstract and storage location information of design/manufacturing information registered in said web servers, to the index server during an idle time of said web servers; an automatic registration operation of automatically registering the abstract and storage location information transmitted from web servers by said transmitting unit, into said index server, wherein
   said transmission operation includes operations of generating an abstract from a text sentence of the design/manufacturing information by a register processing agent and transmitting the abstract and storage location information of the design/manufacturing information by a register processing agent; and
   an index server operation of:
      using a registration accept processing agent to carry out a registration acceptance processing, wherein the registration accept processing agent has an overview index register that stores information relating to a registered document into a repository during an idle time;
      using an ontological restructuring unit to restructure a consistency of an ontology of a hierarchical structure; and
      using an accept signal generator to post to a web server of the plurality of web servers a fact that information has been registered into the index server.

12. The information retrieving method according to claim 11,
   wherein the transmission operation includes, a storage location information generation operation of generating storage location information that shows a storage location of the design/manufacturing information; and an information transmission operation of transmitting an abstract generated at the abstract generation operation and storage location information generated at the storage location information generation operation, to said index server during an idle time of said web servers.

13. The information retrieving method according to claim 12,
   wherein the abstract generation operation is for converting the design/manufacturing information into a text, and then converting this text into an XML format, thereby to generate an abstract of the text and the XML format.

14. The information retrieving method according to claim 12,
   wherein the storage location information generation operation is for generating URLs as addresses of said web servers on the Internet.

15. The information retrieving method according to claim 12,
   wherein the information transmission operation further includes,
      a storage operation of storing into a first repository an abstract generated at the abstract generation operation and storage location information generated at the storage location information generation operation respectively,
      wherein, at the information transmission operation, the abstract and the storage location information stored in the first repository are transmitted to said index server during an idle time of said web servers.

16. The information retrieving method according to claim 11,
   wherein the automatic registration operation is an operation at which a registration accept processing agent automatically registers the abstract and the storage location information transmitted from said web servers at the transmission operation, to said index server.

17. The information retrieving method according to claim 16,
   wherein the automatic registration operation includes,
      a storage operation of storing an abstract and storage location information of the design/manufacturing information into a second repository during an idle time of said index server;
      an ontology restructuring operation of restructuring the consistency of the ontology of a hierarchical structure relating to the design/manufacturing information; and
      a posting operation of posting to said web servers a message that an abstract and storage location information of the design/manufacturing information have been stored in the second repository.

18. The information retrieving method according to claim 17,
wherein the abstract and the storage location information of the design/manufacturing information are transferred between the first repository and the second repository by inter-repository communications.

19. The information retrieving method according to claim 11, further comprising an overview operation of having a birds-eye view of the design/manufacturing information based on an abstract and storage location information of the design/manufacturing information in said index server.

20. The information retrieving method according to claim 11, further comprising a retrieval operation of retrieving design/manufacturing information based on an abstract and storage location information of the design/manufacturing information registered in said index server.

21. An information retrieving method for retrieving design/manufacturing information of a great variety of file formats registered in a plurality of web servers, by using an index server, the information retrieving method comprising:
a transmission operation of transmitting an abstract and storage location information of design/manufacturing information registered in said web servers, to the index server during an idle time of said web servers;
an automatic registration operation of automatically registering an abstract and storage location information transmitted from web servers by said transmitting unit, into said index server, wherein
said transmission operation includes operations of generating an abstract from a text sentence of the design/manufacturing information by a register processing agent and transmitting the abstract and storage location information of the design/manufacturing information by a register processing agent, and the information retrieving method is automatically carried out when registered information is dropped onto a registration icon prepared at the registration side; and
an index server operation of:
using a registration accept processing agent to carry out a registration acceptance processing, wherein the registration accept processing agent has an overview index register that stores information relating to a registered document into a repository during an idle time;
using an ontological restructuring unit to restructure a consistency of an ontology of a hierarchical structure; and
using an accept signal generator to post to a web server of the plurality of web servers a fact that information has been registered into the index server.

22. An information retrieving method for retrieving design/manufacturing information of a great variety of file formats registered in a plurality of web servers, by using an index server, the information retrieving method comprising:
a transmission operation of transmitting an abstract and storage location information of design/manufacturing information registered in said web servers, to the index server during an idle time of said web servers; an automatic registration operation of automatically registering an abstract and storage location information transmitted from web servers by said transmitting unit, into said index server, wherein
said transmission operation includes operations of generating an abstract from a text sentence of the design/manufacturing information by a register processing agent and transmitting the abstract and storage location information of the design/manufacturing information by a register processing agent,
said design/manufacturing information registered is managed in a repository based on a given drawing number system, and
when there is no suitable drawing number given, a drawing number of the registered information is automatically generated from a drawing number or an abstract in a higher-order system; and
an index server operation of:
using a registration accept processing agent to carry out a registration acceptance processing, wherein the registration accept processing agent has an overview index register that stores information relating to a registered document into a repository during an idle time;
using an ontological restructuring unit to restructure a consistency of an ontology of a hierarchical structure; and
using an accept signal generator to post to a web server of the plurality of web servers a fact that information has been registered into the index server.

23. The information retrieving method according to claim 22, wherein an allocation of a flow diagram and a material of an IDEF based on a work process diagram at a retrieving time can be freely selected from a menu of the drawing number system.

24. An information retrieving method for retrieving design/manufacturing information of a great variety of file formats registered in a plurality of web servers, by using an index server, the information retrieving method comprising:
a transmission operation of transmitting an abstract and storage location information of design/manufacturing information registered in said web servers, to the index server during an idle time of said web servers;
an automatic registration operation of automatically registering an abstract and storage location information transmitted from web servers by said transmitting unit, into said index server,
wherein said transmission operation includes operations of generating an abstract from a text sentence of the design/manufacturing information by a register processing agent and transmitting the abstract storage location information of the design/manufacturing information by a register processing agent, and
CAD design/manufacturing information, which includes at least one of a structure diagram of an ICAD-MX or a circuit diagram of the ICAD-MX is converted into text information, thereby to automatically generate an abstract; and
an index server operation of:
using a registration accept processing agent to carry out a registration acceptance processing, wherein the registration accept processing agent has an overview index register that stores information relating to a registered document into a repository during an idle time;
using an ontological restructuring unit to restructure a consistency of an ontology of a hierarchical structure; and
using an accept signal generator to post to a web server of the plurality of web servers a fact that information has been registered into the index server.

25. A computer-readable recording medium recorded with a program for retrieving design/manufacturing information of a great variety of file formats registered in a plurality of web servers, by using an index server, the recording medium being recorded with a program comprising:
- a transmission operation of transmitting an abstract and storage location information of design/manufacturing information registered in said web servers, to the index server during an idle time of said web servers; and
- an automatic registration operation of automatically registering an abstract and storage location information transmitted from web servers by said transmitting unit, into said index server, wherein
- said transmission operation includes operations of generating an abstract from a text sentence of the design/manufacturing information by a register processing agent and transmitting the abstract and storage location information of the design/manufacturing by a register processing agent; and an index server operation of:
- using a registration accept processing agent to carry out a registration acceptance processing, wherein the registration accept processing agent has an overview index register that stores information relating to a registered document into a repository during an idle time;
- using an ontological restructuring unit to restructure a consistency of an ontology of a hierarchical structure; and
- using an accept signal generator to post to a web server of the plurality of web servers a fact that information has been registered into the index server.

* * * * *